United States Patent [19]

Wilwerding

[11] Patent Number: 4,801,795
[45] Date of Patent: Jan. 31, 1989

[54] SPATIAL FREQUENCY FILTER IN WHICH FREQUENCY COMPONENTS GREATER THAN THE NIQUIST FREQUENCY ARE SUPPRESSED

[75] Inventor: Dennis J. Wilwerding, Arapahoe, Colo.

[73] Assignee: Honeywell Inc., Minneapolis, Minn.

[21] Appl. No.: 92,269

[22] Filed: Aug. 31, 1987

[51] Int. Cl.[4] .............................................. G01J 1/20
[52] U.S. Cl. ...................................... 250/201; 354/407
[58] Field of Search .................... 250/201 PF, 204; 354/406, 407, 408

[56] References Cited

U.S. PATENT DOCUMENTS

| | | | |
|---|---|---|---|
| 4,171,155 | 10/1979 | Jyojiki et al. | 354/407 |
| 4,185,191 | 1/1980 | Stauffer | 250/204 |
| 4,460,260 | 1/1984 | Utagawa | 354/406 |
| 4,676,623 | 6/1987 | Akashi et al. | 354/408 |

Primary Examiner—David C. Nelms
Assistant Examiner—William L. Oen
Attorney, Agent, or Firm—Charles J. Ungemach

[57] ABSTRACT

Apparatus and method for suppressing high frequency components in a scene being viewed and particularly components in access of the Nyquist frequency for use in autofocus camera work so as to maximize the use of the low frequency components.

20 Claims, 2 Drawing Sheets

SPATIAL FREQUENCY FILTER IN WHICH FREQUENCY COMPONENTS GREATER THAN THE NIQUIST FREQUENCY ARE SUPPRESSED

BACKGROUND OF THE INVENTION

1. Field of the Invention.

The present invention relates to apparatus for suppressing optical frequencies which are in excess of the Nyquist frequency for use in optical systems such as autofocus cameras.

2. Description of the Prior Art.

In autofocus systems, such as that described in Norman L. Stauffer U.S. Pat. No. 4,185,191, assigned to the assignee of the present invention, a problem is encountered when the scene being viewed contains high spatial frequencies. More particularly, when frequencies in excess of the Nyquist frequency are imaged on the lenslets of the autofocus system, the number of data points becomes less than 2 for each cycle with the result that the information obtained from the samples becomes inaccurate and the frequency produced by the samples becomes erroneous. The phase from the signal from the sample reverses when the spatial frequency is between the Nyquist frequency and twice the Nyquist frequency. Accordingly, the information in such high spatial frequencies is not useful to the autofocus system and can produce undesirable errors. There are currently no optical filters available that will suppress frequencies in excess of the Nyquist frequency and accordingly, other approaches to suppressing such frequencies have been proposed. In the Utagawa U.S. Pat. No. 4,460,260, a solution is proposed wherein multiple rows of lenslets are arranged in a mutually parallel fashion and the outputs of the detectors behind each of the lenslets is summed from one row to the next to produce an output. The lenslets are staggered or arranged in such a fashion that high frequency information is presented to the lenslets over different portions of the surface thereof from one row to another. Thus, the effect of the high frequency scene on the lenslets is different from one parallel row to the next and the summed output of the detectors does not respond to these higher frequencies to the same extent as the detectors respond to lower frequencies. Accordingly, the offsetting images operate to suppress the higher frequencies in a desirable manner.

The difficulty encountered with the solution presented by the Utagawa patent is the requirement for having pluralities of rows of lenslets spaced accurately in parallel fashion and connecting the outputs of the detectors together. The lenslet detector combinations are difficult to manufacture and the requirement of three or more parallel rows of such combinations is extremely difficult to achieve.

SUMMARY OF THE INVENTION

The present invention may be used with a single row of lenslets as they are commonly employed in the autofocus circuitry presently in use in the industry. The scene information which is focused on the lenslets is caused to be split and offset so that, for example, the upper half of the lenslet receives the scene as it would have been received over the entire lenslet in the prior art, but the scene imaged on the lower half of the lenslet is transposed by a certain distance so that it becomes offset with respect to the upper half. Thus, the lenslets receive offset information which, as with the Utagawa patent, suppresses the high frequency information.

The offsetting of the scene focused on the lenslets may be produced by splitting the lens which focuses the scene on the lenslets and moving the one portion of the lens with respect to the other. Alternately, the radiation passing through the taking lens of the camera may strike a pair of prisms or mirrors which are inclined with respect to one another so that the image on the lenslets is split and transposed.

BRIEF DESCRIPTION OF THE DRAWINGS

FIG. 14 shows an optical arrangement for the autofocus system in which a pair of oppositely inclined mirrors is employed similar to that shown in FIG. 13 except that the mirrors and the lenslets have been rotated 90 degrees;

FIG. 14a shows a bottom view of the inclined mirrors of FIG. 14;

FIG. 14b shows a side view of FIG. 14a;

FIG. 14c shows a side view of the lenslets of FIG. 14;

FIG. 15 is an alternate embodiment of the invention wherein the lens of FIG. 11 is split into 4 parts; and FIG. 16 shows the radiation pattern as it might exist on two of the detectors from the lens arrangement of FIG. 15.

DETAILED DESCRIPTION OF THE PREFERRED EMBODIMENTS

Figure 10:
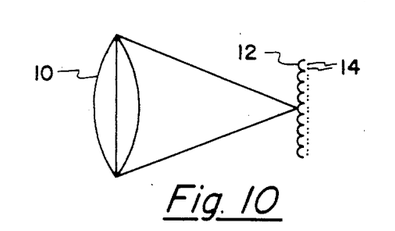
FIG. 10 shows the basic optical system for the camera without the use of the present invention.

In the autofocus system described in the above-mentioned U.S. Pat. No. 4,185,191 as can be seen in FIG. 10, a main lens 10, which may be the taking lens of a camera operates to receive light from a remote object and to produce an image of the scene being viewed on a plurality of lenslets 12. Each of the lenslets in the array 12 has a pair of detectors 14 mounted therebehind in such a position that an image of the exit pupil of lens 10 will be formed on the detectors 14. When the lens 10 is in a position which properly focuses an image of the remote object on the lenslets 12, the output of the upper detector in each of the pairs equals the output of the lower detector in each of the pairs. If the outputs of all of the upper detectors were viewed on a graph and the outputs of the lower detector superimposed thereupon, the two curves which would be produced would substantially match or be superimposed when the object was in proper focus. As the object moves out of proper focus, the outputs of the upper and lower detectors change in such a way that the curves produced by their output move away from the superimposed position in a direction which depends upon the direction of the out-of-focus condition. By analyzing the outputs of the detectors, a signal is obtained indicative of the amount and direction that the two output curves differ from one another and this output relates to the amount of motion of lens 10 necessary to bring the image of the remote object back into focus.

Of course, the curves generated by the outputs of the individual detectors must, according to sampling theory, have at least two sampling points for each cycle of information received. When the spatial frequency of the remote object is high enough, the sample points become two or less with the result that the output of the detectors is no longer indicative of the focus condition. The condition where exactly two samples per cycle is obtained is known as the Nyquist frequency and it is above the Nyquist frequency that the problem most severely occurs. This may be clearly seen in connection with FIGS. 1-4.

Figure 1:
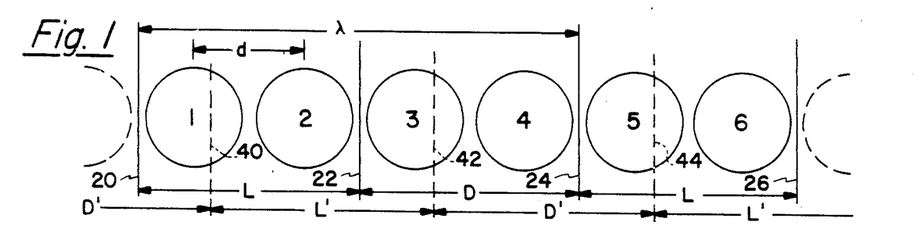
FIG. 1 shows a plurality of lenslets which are subjected to a relatively low spatial frequency.

In FIG. 1, six of the plurality of lenslets are shown numbered 1-6. The distance between adjacent lenslets is identified as distance "d". For simplicity, a scene being viewed by the main lens is shown comprising alternate dark and light areas which are projected onto the six lenslets as can be seen by vertical lines 20, 22, 24, and 26. The portion between vertical lines 20 and 22 will, for purposes of explanation, be considered as a light portion "L" which is shown encompassing the entire area of lenslets 1 and 2. The portion of the scene between vertical lines 22 and 24 will be considered a dark portion "D" which is seen to encompass the entire area of lenslets 3 and 4. The portion of the scene between vertical lines 24 and 26 will be considered another light portion "L" which is seen to encompass the entire area of lenslets 5 and 6. This scene may go on beyond lenslets 6 and may occur before lenslet 1, but for purposes of explanation, only the six lenslets will be viewed.

It is seen that an image having alternate light and dark portions is so arranged that every alternate pair of lenslets receives the opposite contrasting image. One cycle of the information above occurs every 4 lenslets for example between vertical lines 20 and 24. The wave length is, in this case, equal to 4d and thus the frequency of the scene being viewed is ¼d. In such a case, 4 sample outputs will be obtained during one cycle of the scene which is more than the 2 bits of information required for proper operation. The Nyquist frequency is, of course, in the example of FIG. 1, equal to ½d.

Figure 2:
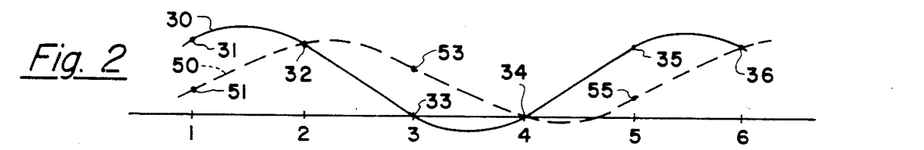
FIG. 2 shows the output that may be obtained from the low frequency condition of FIG. 1 and how the output can change when the low frequency image moves with respect to the lenslets.

FIG. 2 shows a first curve as a solid line 30 that has been drawn between output signals that might be obtained from the detectors behind each of the lenslets 1-6. More particularly, the output of the detectors behind lenslets 1 and 2, since they are both entirely within the light area, would be high as represented by points 31 and 32 respectively. The output of the detectors behind lenslets 3 and 4, since they are entirely in the dark portion of the scene, would be low as represented by points 33 and 34 respectively. The output of the detectors behind lenslets 5 and 6 would, since they are again entirely within the light portion of the scene, be the high values represented by points 35 and 36 respectively shown in the present case equal to the levels of points 31 and 32 although such is not necessarily the case in a real scene being viewed. In any event, a curve constructed from the points 31-36 would appear as curve 30, for example. If the main lens focusing the scene on the lenslets 1-6 of FIG. 1 were in a proper focus position, the outputs of both detectors behind each of the lenslets would be equal and curve 30 would represent both of the detector outputs.

If the scene being viewed were to move out of proper focus, then the image on the lenslets 1-6 would split into two images and move apart from one another. In FIG. 1 this split is shown as if one portion of the image were to move to the right with respect to the other portion of the image. As this occurs, the output of one of the detectors behind each of the lenslets changes in such a way as to create a plurality of points which, when joined into a curve, is similar to, but no longer superimposed on curve 30. In FIG. 1, this out-of-focus condition is shown by a set of alternate light and dark portions between vertical lines shown as dash lines 40, 42, and 44. (A fourth vertical line representing the new position of line 26 would now be off the drawing.)

It is seen that the movement of this image on lenslets 1-6 now produces a pattern of the same wavelength and frequency as before but now shifted to the right (because of an assumed direction of misfocus) so that lenslet 1 is about ¾ dark and ¼ light, lenslet 2 is still completely light, lenslet 3 is about ¾ light and ¼ dark, lenslet 4 is still completely dark, lenslet 5, like lenslet 1 is about ¾ dark and lenslet 6, like lenslet 2, is entirely light. With the arrangement shown between the dash lines 40-44 in FIG. 1, the outputs of one of the detectors behind the lenslets would appear as a dash line curve 50 in FIG. 2. More particularly, since lenslet 1 is about ¾ in the dark, one detector output might be represented by point 51. The output of the detectors behind lenslet 2, since they are entirely in the light, would be the same value as before, i.e., point 32. One of the detectors behind lenslet 3 would no be ¾ in the light and accordingly its output might be represented by point 53. The detectors behind lenslets 4 would still be entirely in the dark so their output would be represented by point 34. One of the detectors behind lenslets 5 would now be ¾ in the dark and accordingly its output might be represented by point 55. And the output of the detectors behind lenslets 6 would, since they are still entirely within the light, be represented by point 36. Thus, the curve 50 can be generated from these points and it is seen that the curve 50 has apparently moved to the right with respect to curve 30. The detection apparatus associated with the autofocus circuitry would determine this apparent motion of curve 50 and would thus know that the image on lenslets 1-6 had apparently moved to the right. With this information the main lens will be refocused. This is as it should be and represents the desirable operation of the system.

Figure 3:
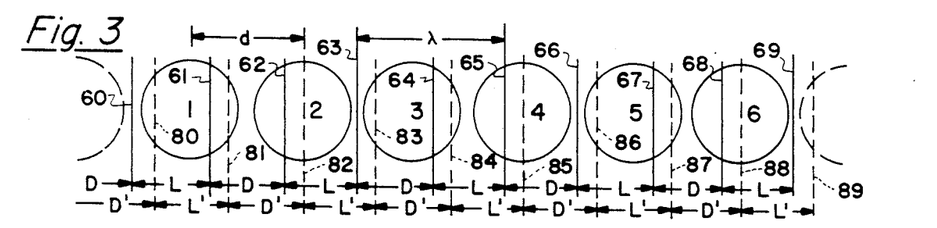
FIG. 3 shows a plurality of lenslets subjected to a frequency greater than the Nyquist frequency.
Figure 4:
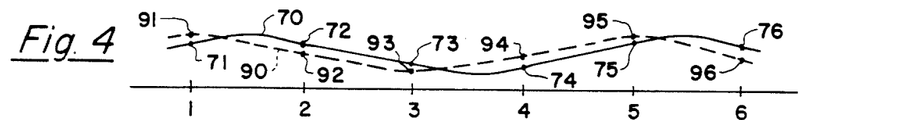
FIG. 4 shows the output that may be obtained from the scene of FIG. 3 and how it changes when the high frequency image moves with respect to the lenslets.

Reference to FIGS. 3 and 4 will show what occurs when the frequency of the scene is greater than the Nyquist frequency. In FIG. 3, six lenslets numbered 1-6 are again shown from the plurality of lenslets used in the normal system and again the lenslets have a spacing between their centers equal to "d". In FIG. 3, vertical lines 60-69 show the image of a scene which, for purposes of explanation, will again be assumed to be alternate light "L" and dark "D" portions. The portion of the scene between vertical lines 60 and 61 is shown to be light and to encompass about ⅔ of lenslet 1. The portion of the scene between vertical lines 61 and 62 is shown to be dark and to cover about ⅓ of lenslet 1 and ⅓ of lenslet 2. The portion of the scene between vertical lines 62 and 63 is light and is shown to cover about ⅔ of lenslet 2. The same pattern repeats over lenslets 3 and 4 and again over lenslets 5 and 6. The result is that alternate light and dark portions, which alternately cover about ⅔ of a lenslet, appear throughout the range of the lenslets. Under these circumstances, the wavelength of the scene being viewed is about 1⅓ lenslets or 4d/3. Accordingly, the frequency of the scene in FIG. 3 will be ¾d which, is greater than the Nyquist frequency ½d.

With the arrangement of FIG. 3, the outputs of the detectors behind lenslets 1-6 will produce a curve like that shown as solid line 70 in FIG. 4. More particularly, since the detectors behind lenslet 1 are about ⅔ in the light, the output therefrom might be represented by point 71. Similarly, lenslet 2 is bathed in about ⅔ light, the output of the detectors therebehind would be represented by point 72. Lenslet 3 is about ⅔ in the dark and accordingly its output could be represented by point 73 and lenslet 4 is also about ⅔ in the dark so that its output would be represented by point 74. Lenslets 5 and 6 are in the same condition as lenslets 1 and 2 and accordingly their outputs could be shown by points 75 and 76 respectively. Thus, with the points 71-76 available to the processing apparatus, the curve 70 could be constructed to represent the output of the scene. As explained in connection with FIGS. 1 and 2, if the image on the lenslets 1-6 were in focus, both of the detectors behind each of the lenslets would have an output represented by curve 70 and these outputs would be superimposed. If the scene were not in focus, however, the image would appear to shift on lenslets 1-6 and the outputs of the detectors would change. More particularly, in FIG. 3, if it is assumed that the scene is out of focus so that the pattern represented by vertical lines 60-69 is moved to the right, the new pattern might appear between dash lines 80-88. Under these circumstances, the portion of the scene between vertical lines 80 and 81 would be light "L'" encompassing about the central ¾ of lenslet 1. The portion of the scene between vertical lines 81 and 82 would be dark "D'" and would cover about ⅛ of lenslet 1 and about half of lenslet 2. The portion of the scene between vertical lines 82 and 83 would be light "L'" and would cove the remaining half of lenslet 2 and about ⅛ of lenslet 3. It is seen that this pattern repeats through lenslets 4, 5, and 6, with the same wavelength and frequency, but offset from the previous pattern slightly to the right (again because of an assumed misfocus direction). Accordingly, the outputs of one of the detectors behind lenslets 1-6 would now change so as to generate a curve like dash line 90 in FIG. 4. More particularly, since lenslet 1 is about ¾ in the light, the output of one detector may be represented by point 91. Similarly, the output of one detector behind lenslet 2 would be about ½ light and accordingly its output would be represented by point 92. The output of one detector behind lenslet 3 would be about ¾ in the dark and accordingly its output could be represented by point 93. One detector behind lenslet 4 would again be exposed to about ½ of the light and accordingly its output could be represented by point 94. The output of one of the detectors behind lenslets 5 and 6 would be a repetition of the output of the similar detectors behind lenslets 1 and 2 and accordingly their output could be represented by points 95 and 96. The curve that can be created from the information points 91-96 is shown as dash line 90 which appears to be similar to curve 70 but moved towards the left in FIG. 4. Accordingly, the analyzation circuitry for the autofocus system would erroneously detect that the image had moved to the left in FIGURE when in fact it had moved to the right. This occurs because the frequency of the scene being viewed is above the Nyquist frequency with the result that their has been a phase shift in the opposite direction from that which should occur. Accordingly, an erroneous output would be obtained and the camera would attempt to focus in error.

Figure 9:
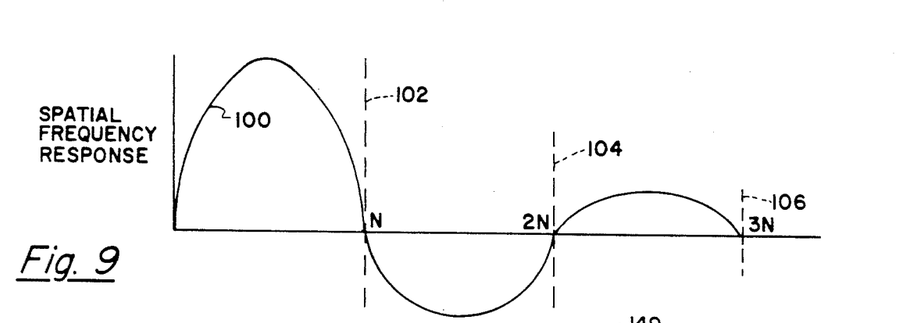
FIG. 9 shows a graph of the spatial frequency response that is obtained as the spatial frequency on the lenslets increases from 0 to 3 times the Nyquist frequency.

The output of the autofocus detectors, when viewed as a function of the frequency of the scene being viewed, appears as the curve 100 of FIG. 9. It is seen that as the frequency increases from left to right, curve 100 rises to a maximum value and then falls off as the frequency approaches dash line 102 which represents the Nyquist frequency "N". As the frequency increases still further, the spatial frequency response reverses phase so that between dash line 102 and dash line 104 representing the frequencies between the Nyquist frequency "N" and twice the Nyquist frequency "2N", a phase reversal has occurred. Thereafter, as the frequency increases yet further between dash line 104 and dash line 106, representing the frequencies between twice the Nyquist frequency "2N" and three times the Nyquist frequency "3N", the curve again becomes of the proper phase, although the response has fallen off considerably from what was obtained below the Nyquist frequency.

Nearly all scenes being viewed by an optical system contain a number of different frequencies ranging from practically 0 to, in some cases, very high. From the above analysis, it is seen that, should the image contain a high proportion of frequencies above the Nyquist frequency, an erroneous output signal could be obtained. Thus, the desirability for suppressing the higher frequencies will result in a scene being viewed containing predominantly the lower than Nyquist frequency signals and a proper output from the autofocus circuitry will result. Although no optical filters are presently available that will suppress the high frequency component satisfactorily, it has been found that if the scene being viewed can be presented to a first row of lenslets in a manner shown by FIG. 3 but then presented to a second row of lenslets parallel to the first row in a manner which shifts the scene a predetermined amount on the second row with respect to the first row, then the outputs of the first detector behind the two rows can be summed and since the effect of the higher frequencies will have different effects on the different lenslets, these higher frequencies will be suppressed. Such a system is described in the above-mentioned U.S. Pat. No. 4,460,260. The difficulty with the above solution is the requirement for plural rows of lenslets and detectors which are quite difficult and costly to construct.

The present invention operates to creat two or more images of the scene being viewed by each of the lenslets and thus to obtain a similar cancelling effect for the high frequency components without the need for plural rows of detectors and lenslets. More particularly, to suppress frequencies between "N" and "2N", a mid frequency, say "1.5N" may be chosen to be eliminated in which case frequencies on either side of the chosen frequency would be suppressed to various extents thus causing an overall reduction in the undesirable frequencies. To remove the effect of the frequency shown in FIG. 3 which, is 1.5 times the Nyquist frequency, i.e., half way between lines 102 and 104 in FIG. 9, the second image of the scene being viewed by each of the lenslets 1–6 should be shifted in the row direction with respect to the first image being viewed by ½ cycle. More particularly, in FIG. 5, the lenslets 1–6 are now shown with a horizontal line 110 dividing each of the lenslets in the center. Line 110 is shown to graphically represent the equivalent energy falling on the lenslets from each of the images although, in reality, the two images overlap. In this representation, the upper half of the lenslets are again subjected to an image such as shown in FIG. 3 wherein a light portion "L1" exists between a vertical line 120 and a vertical line 121 while a dark portion "D1" exists between a vertical line 121 and a vertical line 122. Another light portion "L1" again exists between a vertical line 122 and a vertical line 123 and this pattern continues through vertical lines 124–129. This alternate light and dark portion has the same wavelength 4d/3 as was the case in FIG. 3 and the same frequency ¾d. As such, the output obtained from the detectors behind the upper half of the lenslets 1–6 would be similar to the line 70 shown in FIG. 4. It should be noted that ¾d=1.5N in the present example.

Figure 5:
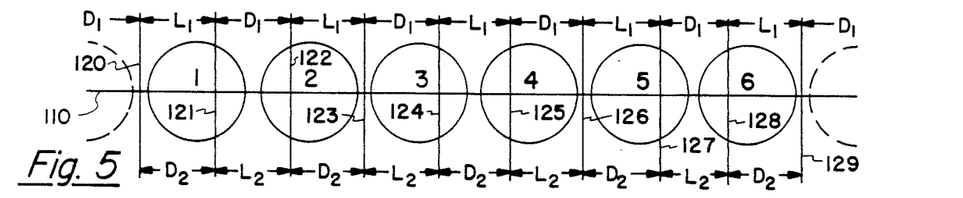
FIG. 5 shows a plurality of lenslets which are again subjected to a frequency greater than the Nyquist frequency but in which the scene on the upper half of the lenslets and the scene on the lower half of the lenslets are shifted by one half cycle.
Figure 6:
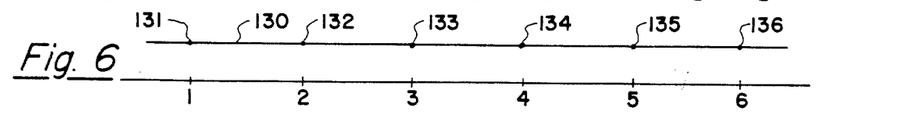
FIG. 6 shows the output that may be obtained from the arrangement of FIG. 5.

In FIG. 5, however, arrangements have been made, as will hereinafter be described, to shift the image being viewed by the lower half of the lenslets 1–6 by a half cycle and accordingly between lines 120 and 121 in FIG. 5, the lower half of the lenslets receive a dark "D2" area, between lines 121 and 122, the lower half of the lenslets receive a light "L2" area, and between lines 122 and 123, the lenslets receive another dark "D2" area in a manner opposite to that found on the upper half of the lenslets. This cycle repeats throughout lines 123–129 and accordingly, the output of the detectors behind each of the lenslets in the lower half thereof will be exactly opposite to that from the upper half. As such, their effects cancel and a straight line output shown as solid line 130 in FIG. 6 results. More particularly, the output of the detectors behind lenslet 1 would be about ⅔ light in the upper half and ⅓ light in the lower half but about ⅓ dark in the upper half and ⅔ dark in the lower half. The sum of these outputs would be about half light and half dark and accordingly, point 131 would represent the output of the detectors behind lenslet 1. In similar fashion, the output of the detectors behind lenslets 2–6 would be half light and half dark and accordingly, their outputs would be represented by points 132–136. This then would generate a flat line curve 130 which would have no effect on the output of the system since no frequency would be involved. The offset which is shown in FIG. 5 substantially completely eliminates the effects of a frequency equal to 1.5 times the Nyquist frequency. Other frequencies around this point would be suppressed but not completely eliminated but overall significant suppression of the frequencies between "N" and "2N" is accomplished. Since frequencies further and further from 1.5N, have less and less suppression most of the frequencies below the Nyquist frequency would b substantially unsuppressed and would still be available for use in autofocusing. Frequencies greater than twice the Nyquist frequency would also have little suppression but since their effect is small, no particular problem results.

Figure 7:
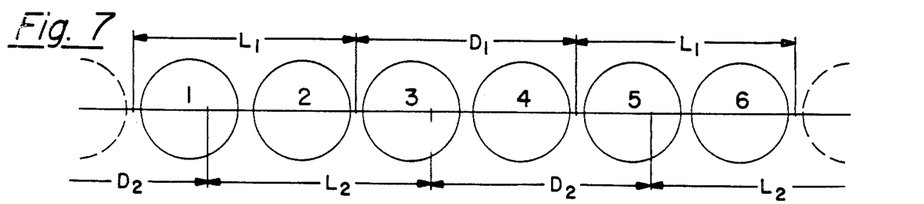
FIG. 7 shows a plurality of lenslets subjected to a relatively low frequency but which have the scene presented to the upper half of the lenslets shifted with respect to the scene presented to the lower half of the lenslets by the same amount as was the case in connection with FIG. 5.
Figure 8:
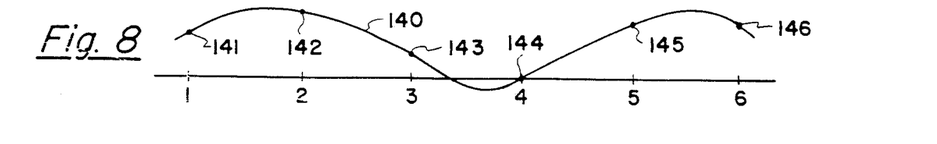
FIG. 8 shows the output that may be obtained with respect to the low frequency information presented to the lenslets of FIG. 7.

To show how the low frequency components still prevail, even with the offset produced by FIG. 5, reference may be made to FIG. 7. In FIG. 7, the lenslets 1–6 are subjected to a lower frequency image similar to that shown in FIG. 1 but the image is split as in FIG. 5. More particularly, with the representation like FIG. 5, the upper half of the lenslets 1 and 2 are entirely subjected to the light portion of the image "L1" while the upper half of the lenslets 3 and 4 are entirely subjected to the dark portion of the image "D1" and the upper half of lenslets 5 and 6 are again subjected to the light portion of the image "L1". The lower half of lenslets 1–6 are subjected to the same frequency and wavelength of the image as the upper half but now shifted by the same amount as was the case in FIG. 5, i.e., about ⅔ of the distance across the lenslet. Accordingly, in FIG. 7, lenslet 1 in the lower half receives about ⅔ of the dark signal "D2" and about ⅓ of the light signal "L2" Lenslet 2 still receives an entirely light signal in the lower half, but lenslet 3 receives about ⅓ of a dark signal "D2". Lenslet 4 receives an entirely dark signal in the lower half, lenslet 5 about ⅓ of a light signal, and lenslet 6, an entire light signal. Accordingly, a curve such as shown by solid line 140 in FIG. 8 may be generated by the outputs of both of the detectors behind lenslets 1–6 (during an in focus condition). More particularly, since the upper half of lenslet 1 is entirely in the light and ⅓ of the lower half is in the light, the output of the detectors behind lenslet 1 may be represented by point 141. The output of the detectors behind lenslet 2 would be a high value since both halves are entirely subjected to light and this may be represented by point 142. The detectors behind lenslet 3 are, in the upper half of the lenslet, entirely in the dark and about ⅓ in the dark on the lower half. Accordingly, the output of the detectors behind lenslet 3 may be represented by point 143 and the detectors behind lenslet 4 would be at a minimum since both halves of the lenslet are subjected to dark and accordingly their output can be represented by point 144. The output of the detectors behind lenslet 5 would be similar to those behind lenslet 1 and the output of the detectors behind lenslet 6 would be similar to those represented by the detectors behind lenslet 2 and accordingly these outputs may be represented by points 145 and 146. Thus, the curve 140 can be generated and it should be noted that this curve is quite similar to curve 30 of FIG. 2 except that the output of the detectors behind lenslets and 5 has decreased a little while the output of the detectors behind lenslet 3 has increased a little. Nevertheless, the shape of curve 140 conforms quite closely to the shape of curve 30 and as far as the analyzation circuitry is concerned, the phase of the signal is substantially the same. Although not shown in FIG. 8, if the scene were to be out of focus so that the image being viewed by the lenslets 1-6 were to move to the right as was the case in FIG. 1, a curve similar in shape to curve 140 would be generated and would rather closely match the curve 50 of FIGURE 2. It would show that the scene had shifted to the right and accordingly the output of the analyzation circuitry would produce autofocus in the proper manner.

It is thus seen that by shifting the image received by the lower half of the detector with respect to the scene being viewed by the upper half of the detectors, the higher frequency components can be suppressed and at least on frequency eliminated. Accordingly, the system will operate properly on the lower frequency images that exist in the scene being viewed as is desirable.

Several ways of accomplishing the shifting of the image with respect to the detectors will now be described in connection with FIGS. 11-16.

Figure 11:
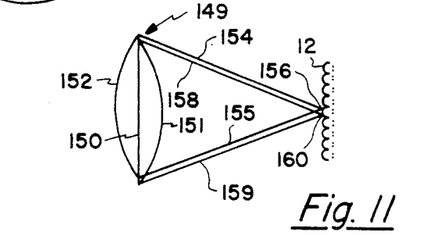
FIG. 11 shows the optical system of the autofocus apparatus wherein the lens projecting the scene on the lenslets has been split and one portion moved with respect to the other.

In FIG. 11, a lens 149, similar to the lens 10 of FIG. 10 has been split along a vertical line 150 and the right half 151 has been moved downwardly with respect to the left half 152. As a result, light from the scene being viewed which passes through the half 152 will travel along lines such as 154 and 155 to be focused on the lenslet array 12 at a point 156. On the other hand, light travelling from the scene being viewed and passing through the half 151 will travel along lines such as 158 and 159 to be focused on the lenslet array 12 at a point 160 which is noted to be slightly lower in FIG. 11 than point 156. The shift is made to occur over a predetermined portion of each of the lenslets in array 12 as, for example, exactly half as was the case in FIGS. 5 and 7. More particularly, if it is assumed that the distance between the centers of the lenslets is d=0.2 mm, the Nyquist frequency can be computed to be 2.5 cycles per mm. If it were desired to make the system insensitive to 1.5N which is equal to 3.75 cycles per mm, the two images should be spaced ¼ cycle apart at this 3.75 cycles per mm or 1−3.75×¼=0.133 mm. Thus, lens half 152 should be moved with respect to lens half 151 by the amount necessary to cause points 156 and 160 on array 12 to be 0.133 mm apart.

Figure 12:
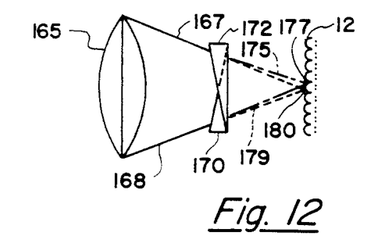
FIG. 12 shows the optical arrangement of the autofocus system in which a pair of oppositely inclined prisms is inserted in the light path between the lens and the lenslets.

FIG. 12 shows a method for displacing the images without splitting the lens. More particularly, in FIG. 12, a lens 165 is shown receiving light from a remote scene and focusing the light along lines such as 167 and 168 towards the lenslet array 12. A pair of oppositely inclined prisms 170 and 172 are shown in this light path. Prism 172 operates to bend the light passing therethrough a small amount upwardly along lines such as shown by dash-dot line 175 so that the image is focused at a point 177 on array 12. Prism 170 operates to shift the light downwardly in FIGURE 12 along lines such as shown by dash lines 179 so as to focus the image at a point 180 on lenslet array 12. It is seen that point 177 is displaced with respect to point 180 by an amount which is determined by the inclination of the prisms 170 and 172. Again, if it were desired to remove the frequency 1.5N, prisms 170 and 172 should be so inclined as to produce a difference between points 177 and 180 equal to 0.133 mm for the situation where the distance between lenslets in array 12 is equal to 0.2 mm.

Figure 13:
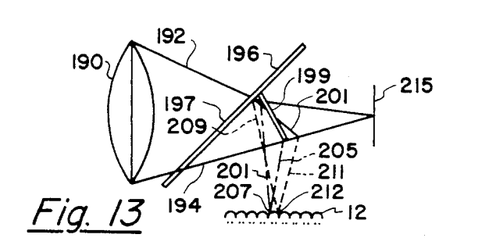
FIG. 13 shows the optical arrangement of the autofocus system in which a pair of oppositely inclined mirrors is employed in the light path between the lens and the lenslets.

Another embodiment is shown in FIG. 13 wherein a lens 190 receives light from a remote scene and focuses the light along paths such as shown by lines 192 and 194 through an inclined member 196 which may be light transmitting in an area 197 thereof so as to pass light from lens 190 to the right where a pair of mirrors 199 and 201, which are slightly oppositely inclined, are positioned to reflect the light therefrom downwardly towards the detector array 12. More particularly, mirror 199 directs light along a path such as shown as dash-dot line 204 and 205 to a point 207 on the lenslet array 12. similarly, mirror 201 directs light along paths such as shown by dash lines 209 and 211 to a point 212 along lenslet array 12. It is seen that points 207 and 212 are displaced slightly along the lenslet array and, the inclination of mirrors 199 and 201 should be chosen so that the difference between points 207 and 212 is again proper for the desired suppression characteristics. In the example given above, the inclination of mirrors 201 and 199 should be such that the difference between points 207 and 212 is equal to 0.133 mm.

The member 196 shown in FIG. 13 is common in cameras and is often used to deflect light to the autofocus circuitry when focusing conditions are desired. At the time a picture is to be taken, the mechanism, including member 196 and mirrors 199 and 201, rotates out of the way behind lens 190 so that light passing through lens 190 can now focus on the film shown in FIG. 13 as plane 215.

Figures 14, 14A, 14B, 14C, 15, 16:
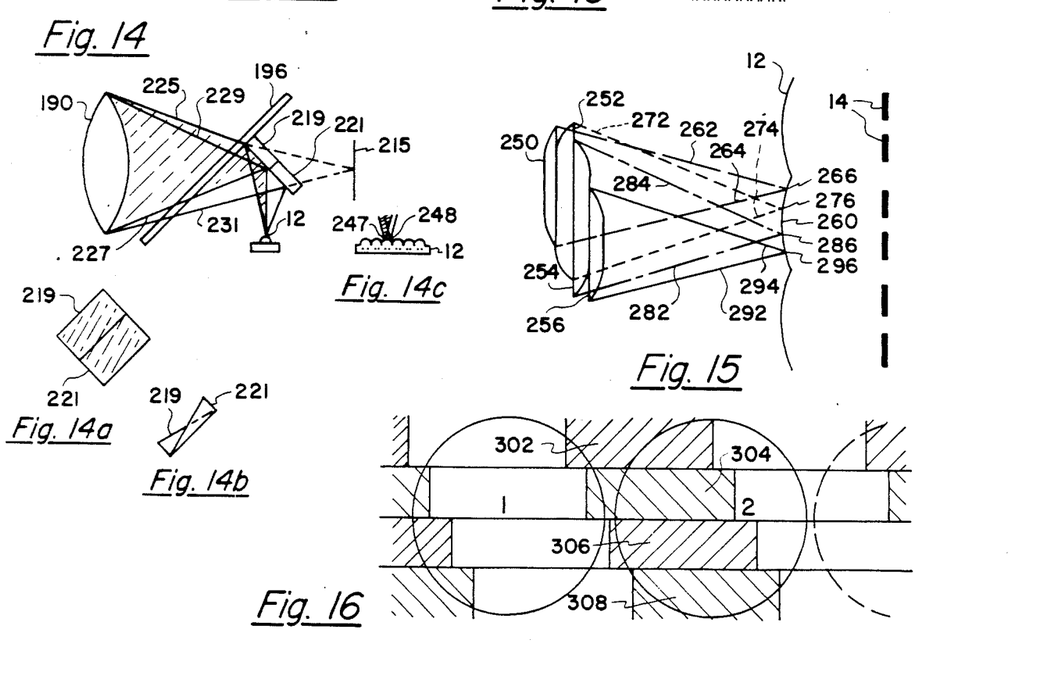

FIG. 14 shows a system similar to FIG. 13 except that the mirrors 199 and 201 of FIG. 13 have been rotated 90 degrees and now appear as mirrors 219 and 221 respectively. It is now seen that light passing through lens 190 travels along paths such as shown by lines 225 and 227 to mirror 219 and passes along lines 229 and 231 to mirror 221. FIG. 14a is a bottom view of mirrors 219 and 221 of FIG. 14 and FIG. 14b is a side view of mirrors 219 and 221 are shown in FIG. 14a. It is seen that the mirrors 219 and 221 are inclined differently and in opposite directions so that the light which is received by mirror 219, shown in FIG. 14 as shaded, passes to the lenslet array 12 but in doing so moves a little outward from the plane of the paper. Similarly, light passing through lens 19 to mirror 221 is reflected down to lenslet array 12, but in doing so moves a little inward into the plane of the paper. FIG. 14c is a side view of the lenslet array 12 of FIG. 14 and the image focused by mirror 219 is again shown in the shaded portion to be focused at a point 247 while the image from mirror 221 is shown focused at a point 248 which is slightly shifted with respect to the lenslets in array 12. As was the case in the previous embodiments, the amount of shifting is accomplished by the tilt of mirrors 219 and 221 and should, with the example above given, be such as to produce a difference of 0.133 mm between points 247 and 248 in FIG. 14.

As was the case in connection with FIG. 13, the member 196 will move out of the way when a picture is to be taken so that the light passing through lens 190 will thereafter be focused on the film plane 215 after autofocus has occurred.

Referring now to FIG. 15, it will be seen that, when desired, the radiation imaged on the lenslets may be divided into more than two parts and thus enable the system to eliminate more than one specific frequency.

In FIG. 15, a lenslet is shown divided into 4 parts as represented by lenslet portions 250, 252, 254, and 256, each of which is displaced with respect to the normal position by an amount which causes the radiation to be dispersed over the surface of the lenslet array 12 such as is shown on a lenslet 260. More particularly, radiation passing through lenslet portion 250 travels along lines such as solid lines 262 and 264 so as to be focused at a point 266 on lenslet 260. Similarly, radiation passing through lenslet portion 252 will travel along lines shown as dash lines 272 and 274 so as to be focused at a point 276 on lenslet 260. Similarly, radiation passing through lenslet portion 254 will travel along lines such a shown by dash-dot lines 282 and 284 to be focused at a point 286 on lenslet 260 and the radiation passing through lenslet portion 256 will travel along lines such as solid lines 292 and 294 so as to be focused at a point 296 on lenslet 260. Similar shifting of the images will occur on the other lenslets in array 12 so that the detectors 14 located therebehind will produce compensating outputs for the high spatial frequencies in a manner similar to that described in connection with the other embodiments.

FIG. 16 shows lenslets 1 and 2 as they might be receiving images of the scene containing the high spatial frequencies. It is seen that lenslets 1 and 2 receive 4 sets of images, each displaced from the one above it by a predetermined amount. In FIG. 16, the dark portion of the image formed by lenslet portion 250 is shown in cross-hatching as at reference numeral 302. The portion of the radiation passing through lenslet portion 252 will form an image that is shifted and the dark portion thereof is shown moved with respect to portion 302 as, for example, at 304. In similar fashion, the radiation passing through lenslet portion 254 will create an image, the dark portion of which will have moved with respect to the portion 304 as is shown by dark portion 306 and, the portion of the radiation passing through lenslet portion 256 will be shifted further as is shown by dark portion 308.

Each shift in the radiation across the surfaces of the lenslets will have compensating effects on the outputs of the detectors so that certain frequencies will be cancelled entirely and frequencies on either side of those certain frequencies will be suppressed in the manner similar to that shown in connection with the other FIGURES. It is, of curse, understood that the mirrors or prisms of FIGS. 12 and 13 could include more than two elements to produce the same kind of effect as is shown in FIG. 16 and that any reasonable number of image shifts may be accomplished by dividing the lens 10 into such number of portions or providing enough prisms or mirrors to accomplish the desired result.

It is thus seen that I have provided a unique way for suppressing high frequency components in a scene being viewed which is desirable for a number of optical systems, particularly an autofocus camera. Many alterations to the embodiments shown will occur to those skilled in the art and I do not wish to be limited to the specific disclosures used in connection with the description of the preferred embodiments. I intend only to be limited by the following claims.

The embodiments of the invention in which an exclusive property or right is claimed are defined as follows:

1. Apparatus for use with radiation sensing means including a plurality of lenslets having a surface upon which radiation patterns are received over an optical path, which patterns may contain undesirable spatial frequencies, comprising:
   radiation directing means mounted in the optical path to divide the radiation into first and second images which overlap, the first and second images being separated on the surface by a distance which causes the undesirable spatial frequencies to have opposing effects on the sensing means to suppress the undesirable spatial frequencies.

2. Apparatus according to claim 1 wherein the plurality of lenslets are spaced a distance d apart, the undesirable spatial frequencies are greater than ½d cycles per millimeter and the distance between the first and second images is less than d.

3. Apparatus according to claim 2 wherein the distance between the first and second parts is substantially ⅔d.

4. Apparatus according to claim 1 wherein the radiation directing means includes a lens which consists of at least two parts which are displaced from a normal position by a predetermined amount.

5. Apparatus according to claim 1 wherein the radiation directing means includes at least two prisms positioned at a predetermined angle with respect to each other.

6. Apparatus according to claim 1 wherein the radiation directing mean includes at least two mirrors inclined at a predetermined angle with respect to each other.

7. Apparatus according to claim 6 wherein the radiation directing means includes a movable member normally positioned in a first plane and the two mirrors are mounted on the movable member at first and second predetermined angles to the first plane respectively.

8. Apparatus according to claim 6 wherein the radiation directing means includes a movable member normally positioned in a first plane and the two mirrors are mounted on the movable member in second and third planes normal to the first plane.

9. Apparatus according to claim 1 wherein the apparatus is part of a camera, the radiation sensing means includes detectors for use in a circuit for automatically focusing the camera and the optical path is from a remote scene to be photographed.

10. Apparatus for a camera having directing means for directing radiation along an optical path from a remote scene to a plurality of lenslets and from each lenslet to pair of radiation detectors which produce an output signal, the radiation directing mean being adjustable in accordance with the output signal to produce a substantially focused image of the remote scene on the lenslets which scene includes undesirable spatial frequencies;
   radiation deflecting means mounted in the optical path to divide the radiation into first and second overlapping images, the first and second images being spaced apart on the lenslets by a distance which causes a predetermined one of the undesirable frequencies to have an opposite effect on the output signal to substantially eliminate the on of the undesirable frequencies 11. The apparatus of claim 10 wherein the lenslets lie along a line substantially joining their centers, and the displacement of the first and second images being along the line.

12. The apparatus of claim 11 wherein the deflecting means comprises first and second half lenses displaced with respect to each other.

13. The apparatus of claim 11 wherein the deflecting means comprises first and second prisms arranged to deflect radiation in different directions.

14. The apparatus of claim 11 wherein the deflecting means comprises first and second mirrors inclined at different angles.

15. The apparatus of claim 11 wherein the lenslets are spaced from each other by a distance "d" along the line and the distance between the first and second images is less than "d".

16. The apparatus of claim 15 wherein the undesirable frequencies include those between ½d and 1/d, and the distance between the first and second images is between d/2 and d.

17. The apparatus of claim 16 wherein the one of the undesirable frequencies is ¾d and the distance between the first and second images is ⅔d.

18. The apparatus of claim 10, wherein the deflecting means comprises more than two radiation deflecting elements, each of which is positioned to deflect radiation in a different direction.

19. The apparatus of claim 18 wherein the deflecting means comprises parts of a lens, each displaced with respect to the others.

20. The method of reducing the effect of high spatial frequencies in a scene being viewed by an optical sensing system which include a plurality of lenslets having a surface to receive images of the scene and deflecting means producing an output which varies with the radiation received on the surface comprising the steps of:
  (1) directing a first image of the scene to the surface;
  (2) directing a second image of the scene, shifted with respect to the first waves along a line, so that it is received on the surface but displaced along the line by an amount which causes the high spatial frequencies to have an opposite effect on the detecting means to reduce the output at such frequencies.

* * * * *

UNITED STATES PATENT AND TRADEMARK OFFICE
CERTIFICATE OF CORRECTION

PATENT NO. : 4,801,795
DATED : January 31, 1989
INVENTOR(S) : DENNIS J. WILWERDING It is certified that error appears in the above-identified patent and that said Letters Patent is hereby corrected as shown below:

Column 12, line 39, after "to" insert --a--.

Column 12, line 51, after "the" cancel "on" and substitute --one--.

Signed and Sealed this

Eleventh Day of July, 1989

Attest:

DONALD J. QUIGG

Attesting Officer

Commissioner of Patents and Trademarks